GAIN CONTROL SIGNAL GENERATOR

Filed June 16, 1961 2 Sheets-Sheet 1

INVENTORS
WALTER B. FORD,
GERALD R. SCHLECHTE,
MARKWICK K. SMITH, JR.
BY John G. Graham
ATTORNEY INVENTORS
WALTER B. FORD,
GERALD R. SCHLECHTE,
MARKWICK K. SMITH, JR.
BY John G. Graham
ATTORNEY United States Patent Office 3,202,926
Patented Aug. 24, 1965

3,202,926

GAIN CONTROL SIGNAL GENERATOR

Walter B. Ford, Irving, and Gerald R. Schlechte and Markwick K. Smith, Jr., Dallas, Tex., assignors to Texas Instruments Incorporated, Dallas, Tex., a corporation of Delaware Filed June 16, 1961, Ser. No. 117,561
4 Claims. (Cl. 330—59)

This invention relates to function-generating apparatus and more particularly to a system for generating a high frequency signal which decays in amplitude according to a preselected function for use in a programmed gain control system for seismic signal amplifiers.

As set forth in the copending application, Serial No. 743,516, filed June 9, 1958, now Patent No. 3,083,341, and assigned to the assignee of the present invention, it is sometimes advantageous to control the gain of a seismic amplifier independent of the seismic signal by an auxiliary high frequency signal. Ordinarily, the signal amplifiers used in a seismic surveying procedure are maintained at a condition of relatively low gain until just after the initial impulse from the explosive charge reaches the seismometers. Thereafter, it is customary to increase the gain of the amplifier at an exponential rate which corresponds to the energy decay of the shot. It is therefore necessary to generate a high frequency gain control signal which may be varied in amplitude according to a predetermined exponential decay function. This fraction must be easily varied in length or altered in decay rate and the output must be smooth and free from spurious transients. Also, initial and terminal gain, before and after the exponential decay, must be easily selected.

It is therefore the principal object of this invention to provide a high frequency signal generator having an output which may be varied in amplitude according to a preselected function.

An additional object of this invention is to provide apparatus for attenuating a high frequency signal according to an exponential decay function.

A further object is to provide high frequency signal attenuating system adapted for use with a programmed gain control arrangement for seismic amplifiers.

In accordance with one embodiment of this invention, a high frequency gain control signal generating system is provided which incorporates an oscillator adapted to produce a signal of substantially constant amplitude. This signal is applied through a variable attenuator to the gain control channel of a seismic amplifier system. The output of the attenuator is sampled and compared with a reference voltage which may be generated by a resistance-capacitance decay network, for example. The difference between the level of the attenuator output and the reference-voltage is used to control the variable attenuator so that the system output will follow the reference function. It is seen that the signal generator output may be made to follow any selected amplitude function, limited only by the difficulty in generating the reference input signal.

The novel features which are believed characteristic of this invention are set forth in the appended claims. The invention itself, however, along with further objects and advantages thereof, will best be understood from the following description of a particular embodiment thereof, when read in conjunction with the acompanying drawing, wherein:

Figure 1:
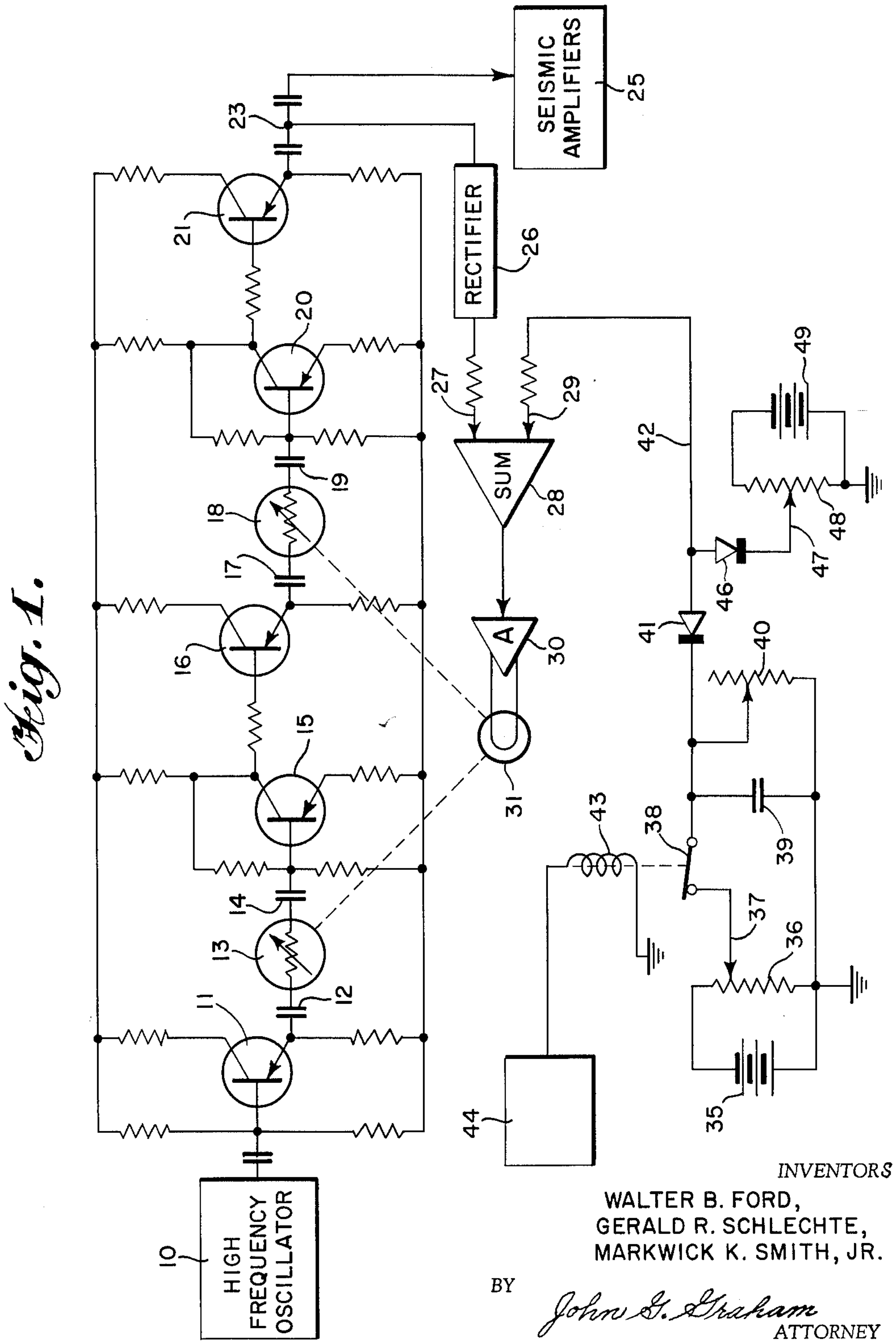
FIGURE 1 is a schematic representation of a signal generating system incorporating the principal features of this invention.

With reference to FIGURE 1, a signal-generating system is illustrated which is adapted to produce a high frequency signal that varies in amplitude according to a preselected function such as may be used for gain control in seismic amplifiers. More particularly, there is shown a high frequency oscillator 10 which is adapted to produce a signal at a frequency of 7.5 kc., for example, and at a substantially constant amplitude. The high frequency output of the oscillator 10 is capacitively coupled to an emitter follower stage including a transistor 11 which matches the high output impedance of the oscillator to the low impedance of the subsequent attenuator.

The emitter of the transistor 11 is coupled by a capacitor 12 to a photosensitive resistor 13. The other terminal of the photosensitive resistor is connected through a capacitor 14 to the input of an amplifier stage including a transistor 15. The amplified high frequency signals appearing on the collector of the transistor 15 are applied to another emitter follower stage including a transistor 16 for impedance matching purposes. The emitter of the transistor 16 is coupled by a capacitor 17 to a second photosensitive resistor 18, the other terminal of the resistor being likewise connected by a capacitor 19 to the input of an amplifier stage including a transistor 20. The collector output of the transistor 20 is applied to an impedance-matching emitter follower stage including a transistor 21. The output at the emitter of the transistor 21 is capacitively coupled to an output terminal 23, the high frequency signal appearing at this terminal being capacitively coupled to the appropriate output utilization means such as a plurality of seismic amplifiers 25. These seismic amplifiers utilize an auxiliary high frequency signal for gain control purposes as set forth in the above-mentioned copending application; that is, the signal appearing at the output terminal 23 would be capacitively coupled to a line 34 of FIGURE 1 of the copending application. This copending application, Serial No. 743,516, shows a seismic system wherein a plurality of seismic amplifiers are employed which include gain control arrangements adapted to vary the gain of the amplifiers in inverse proportion to the amplitude of the auxiliary high frequency gain control input signal.

In seismic prospecting of the type with which we are presently concerned, it is necessary to maintain the gain of the seismic amplifiers at some relatively low value until just after the initial impulse from the shot has reached the seismometers, then to vary the gain of the amplifiers in a manner similar to the decay in amplitude of the reverberations from the shot. After the gain has reached some relatively high value, however, it is appropriate to terminate the exponential increase in gain and maintain the amplifier gain constant at this value.

In order to provide a high frequency signal to the amplifiers 25 having the desired amplitude-versus-time characteristic, a closed loop system is utilized as seen in FIGURE 1. The high frequency output appearing at the terminal 23 is applied to a full-wave rectifier 26 which produces a positive D.-C. voltage corresponding to the amplitude of the high frequency signal. The positive D.-C. output of the rectifier 26 is applied to an input 27 of a D.-C. comparator or summing amplifier 28. A negative D.-C. signal varying according to the desired function of time is applied to a second input 29 of the summer 28. The output of the summer 28 is applied to a D.-C. power amplifier or lamp driver circuit 30, and the output of this amplifier is applied to a lamp 31 which is positioned to illuminate the photosensitive resistors 13 and 18. The lamp 31 is adapted to produce a light output which varies in a generally linear manner in relation to input voltage, and may be of a type commercially available under the trade designation "Chicago Miniature CM 8–666." The photosensitive resistors 13 and 18 are adapted to vary in resistance as a linear function of incident light, and may well take the form of devices commercially available as "Clairex CL 603" resistors.

The negative D.-C. voltage applied to the input 29 of the summer 28 may be generated by a circuit arrangement including a negative source, such as a battery 35, connected across a potentiometer 36. A tap 37 on the potentiometer 36 is applied through a pair of relay contacts 38 to an RC decay network including a capacitor 39 and a variable resistor 40. The contacts 38 are normally closed, and so the capacitor 39 will be initially charged to a negative voltage determined by the position of the tap 37. The negative charge on the capacitor 39 is coupled through a diode 41 and a line 42 to the input 29 of the summer 28. The relay contacts 38 are operated by relay coil 43 which is driven from a time-break signal generator 44. This arrangement is adapted to open the contacts 38 at about the time the first signal reaches the seismic amplifiers from the shot, or at some predetermined delay thereafter. When the contacts 38 open, the capacitor 39 will discharge through the resistor 40, varying the negative voltage at the input 29 in an expotential fashion. To prevent the voltage at the input 29 from decaying below a predetermined negative value, however, the line 42 is also coupled through a diode 46 to a tap 47 on a potentiometer 48, which is connected across a negative supply or battery 49. When the voltage across the capacitor 39 has decayed to a value less negative than the potential between the tap 47 and ground, the diode 41 will be back-biased, and the voltage on the line 42 will thereafter remain at the value selected by the tap 47.

Figure 2:
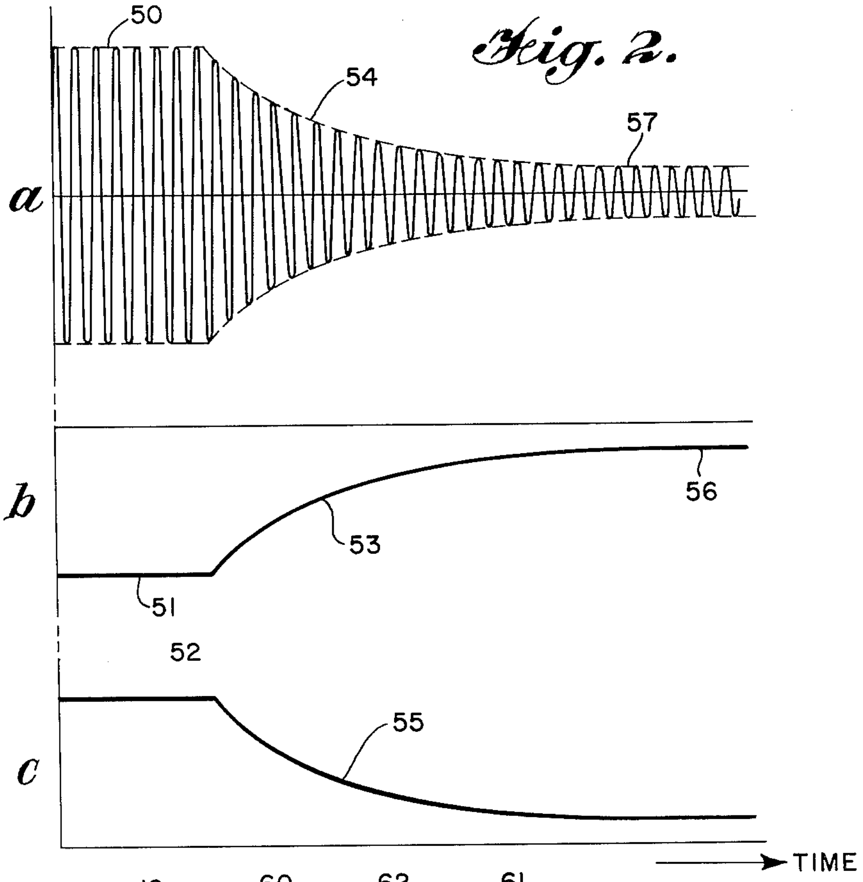
FIGURES 2a–2c are graphic representations of voltage-vs.-time relationships existing at various points in the system of FIGURE 1.

In the operation of the circuit of FIGURE 1, it is seen that prior to the time break, the high frequency signal present at the output terminal 23 will be at some relatively high level 50, as seen in FIGURE 2*a*. This is determined by the charge on the capacitor 39 or the position of the tap 37 which provides a negative D.-C. level 51, as seen in FIGURE 2*b*, at the input 29 of the summer 28. The rectified high frequency signal will appear as a positive voltage on the input 27 at a level 52, as seen in FIGURE 2*c*. Any tendency for the high frequency signal to increase in amplitude above the level 50 will result in a departure from the level 52 at the input 27, producing a difference output from the summer 28, which when amplified and inverted will decrease the intensity of the lamp 31, thereby increasing the resistance of the photosensitive resistors 13 and 18. This has the effect of decreasing the gain of the amplifier stages which include the transistors 15 and 20. In a like manner, a tendancy for the amplitude of the signal at the terminal 23 to decrease below the level 50 will mean that the positive voltage at the input 27 will decrease below the magnitude of the negative voltage at the input 29, producing an output which increases the intensity of the lamp 31, decreases the resistance of the protosensitive resistors 13 and 16, and increases the gain of the amplifier stages including the transistors 15 and 20.

Subsequently, at about the time the first break reaches the seismometers, the time-break generator 44 will energize the relay coil 43 and open the contacts 38. The capacitor 39 will discharge through the resistor 40 so that the voltage at the input 29 will decay according to a line 53, as seen in FIGURE 2*b*. The amplitude of the high frequency signal at the output terminal 23 will tend to follow the decay line 53, since any departure therefrom will result in a compensating increase or decrease in the illumination of the photosensitive resistors 13 and 18 and also in the gain of the corresponding amplifiers. Thus, the high frequency signal will have an envelope 54, as seen in FIGURE 2*a*, while the positive voltage at the input 27 of the summer 28 will follow a line 55, as seen in FIGURE 2*c*. When the charge on the capacitor 39 has decreased below a level determined by the tap 47, however, the voltage at the input 29 to the summer 28 will remain at a level 56, as seen in FIGURE 2*b*, so that the amplitude of the high frequency signal at the terminal 23 will be maintained at an amplitude level 57, as seen in FIGURE 2*a*. It is thus seen that the high frequency signal provided to the seismic amplifiers 25 may be made to follow any particular function of time which may be established by a D.-C. voltage applied to the input 29.

Figure 3:
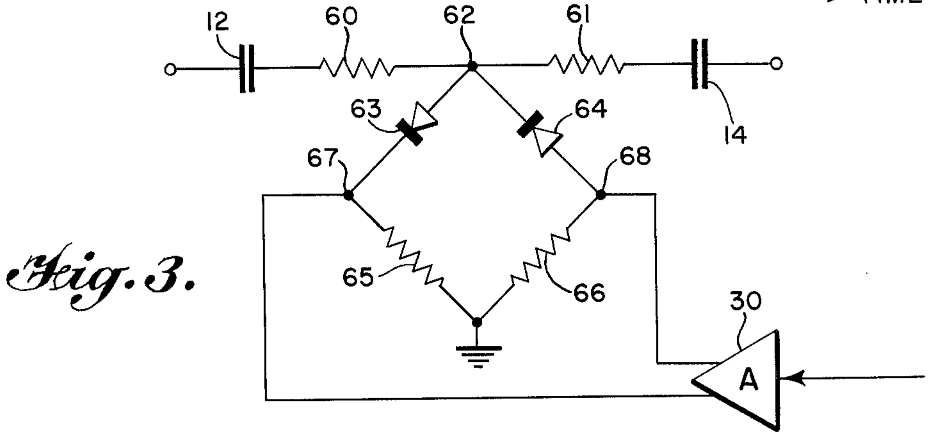
FIGURE 3 is a schematic representation of an alternative form of an attenuator for use in the system of FIGURE 1.

In an alternative embodiment of the invention, the photosensitive resistors 13 and 18 and the lamp 31 may be replaced by a diode bridge attenuator arrangement, as seen in FIGURE 3. That is, the emitter follower output of the transistor 11 would be coupled to the base of the transistor 15 by the capacitor 12, a pair of series resistors 60 and 61, and the capacitor 14. The juncture 62 of the resistors 60 and 61 is shunted to ground by bridge arrangement including a pair of diodes 63 and 64 with a pair of like resistors 65 and 66. The diodes 63 and 64 are matched and act as variable resistors. The output of the D.-C. power amplifier 30 is applied to opposite terminals 67 and 68 of the bridge arrangement so that the current flowing through the diodes 63 and 64 will be determined by the difference between the voltages applied to the inputs 27 and 29 of the summer or comparator 28 of FIGURE 1. This arrangement will control the gain of the high frequency signal amplifiers in a manner similar to the lamp and photosensitive resistor arrangement. A circuit similar to FIGURE 3 would also replace the photosensitive resistor 18 between the transistors 16 and 20. The system of this embodiment would operate in a manner similar to the system of FIGURE 1 which is described above with reference to FIGURES 2*a*–2*c*.

While this invention has been described with reference to specific embodiments, the description is not intended to be construed in a limiting sense. Various modifications may be made by persons skilled in the art, and so it is contemplated that the appended claims will cover any such modifications which are within the true scope of the invention.

What is claimed is:

1. In apparatus for providing a high frequency gain control signal to a seismic amplifier:

(a) a source of high frequency signals, (b) variable-attenuation coupling means connecting the source to the gain controlled seismic amplifier, the coupling means being variable in attenuation in response to a control voltage, (c) means having an input connected to receive the high frequency signals applied to the seismic amplifier effective to produce a first voltage variable according to the magnitude of such signals, (d) resistance-capacitance network for generating a second voltage which varies according to an exponential function of time between first and second voltage levels, said network including means to vary said first and second voltage levels and the rate of change of said exponential function, (e) means for initiating the operation of the resistance-capacitance network in response to a condition, (f) comparator means connected to receive said first and second voltages effective to produce an output voltage related to the difference between the first and second voltages, (g) and means for applying the output voltage produced by the comparator means to the coupling means to vary the attenuation thereof according to the difference between the first and second voltages.

2. In apparatus for providing a high frequency signal which is variable in magnitude from a first level to a second level according to an exponential function of time:

(a) a source of high frequency signals of substantially constant amplitude, (b) an amplifier having an input and an output, (c) variable-attenuation coupling means including a photosensitive resistor connecting the input of the amplifier to the source of high frequency signals, the magnitude of the high frequency signals reaching said input being related to the impedance presented by the resistor, (d) detector means having an input coupled to the output of the amplifier producing a first voltage related to the magnitude of the high frequency signal appearing at the amplifier output, (e) a first variable voltage source for providing a voltage corresponding to the first level, (f) function generator means including a resistance-capacitance network connected to the first variable voltage source through a switch, the function generator means having an output and producing thereon a second voltage which persists at a magnitude corresponding to said first level until the switch is actuated and then decays exponentially with time, (g) a second variable voltage source connected to the output of the function generator means through unidirectionally-conducting means preventing the second voltage from exhibiting a magnitude less than a value corresponding to the second level as selected by the second variable voltage source, (h) comparator means connected to receive the first and second voltages producing an electrical signal related to the difference, (i) a lamp connected to receive said electrical signal and positioned to illuminate the photosensitives resistor, (j) and means for actuating said switch in response to a condition.

3. Apparatus for producing a high frequency signal for gain control of seismic amplifiers comprising:

(a) a source of high frequency signals of substantially constant amplitude, (b) an amplifier having an input and an output, (c) variable-attenuation coupling means including a diode bridge connecting the input of the amplifier to the source of high frequency signals, the magnitude of the high frequency signals reaching said input being related to the impedance presented across opposite terminals of the diode bridge, (d) detector means having an input coupled to the output of the amplifier producing a first voltage related to the magnitude of the high frequency signal appearing at the amplifier output, (e) a first variable voltage source for providing a voltage corresponding to a first high frequency signal level, (f) function generator means including a resistance-capacitance network connected to the first variable voltage source through a switch, the function generator means having an output and producing thereon a second voltage which persists at a magnitude corresponding to said first high frequency signal level until the switch is actuated and then decays exponentially with time, (g) a second variable voltage source connected to the output of the function generator means through a diode which is poled to prevent the second voltage from exhibiting a magnitude less than a value corresponding to a second high frequency signal level as selected by the second variable voltage source, (h) comparator means connected to receive the first and second voltages producing an electrical signal related to the difference, (i) conductive means coupling the electrical signal from the comparator means to the remaining terminals of the diode bridge so that the imepdance presented by the bridge will be determined by the magnitude of the electrical signal, (j) means for connecting the high frequency output of the amplifier to a gain-controlled seismic amplifier, (k) and means for actuating the switch in response to receipt of the first break signals by the seismic amplifier.

4. Apparatus for providing a high frequency signal which is variable in magnitude from a first level to a second level according to an exponential function of time, comprising:

(a) A source of high frequency signals of substantially constant amplitude, (b) an amplifier having an input and an output, (c) variable attenuation coupling means connecting said source of high frequency signals to the input of said amplifier, said coupling means being variable in attenuation in response to a control voltage, (d) detector means having an input coupled to the output of said amplifier effective to produce a first voltage related to the magnitude of the high frequency signals appearing at said output, (e) a first variable voltage source for providing a voltage corresponding to said first level, (f) function generator means including a switch and a resistance-capacitance network connected to said first variable voltage source through said switch, said function generator means producing a second voltage which persists at a magnitude corresponding to said first level until said switch is actuated and then decays according to a selectable exponential function of time, (g) a second variable voltage source connected to the output of said function generator means through unidirectionally-conducting means preventing the second voltage from exhibiting a magnitude less than a value corresponding to the second level as selected by said second variable voltage source, (h) comparator means connected to the output of said detector means and the output of said function generator means to receive the first and second voltages, thereby to produce a control voltage which is related in magnitude to the difference between the magnitudes of the first and second voltages, (i) means for applying the output voltage produced by said comparator means as a control voltage to said variable attenuation coupling means to vary the attenuation thereof, and (j) means for actuating said switch in response to a condition.

References Cited by the Examiner

UNITED STATES PATENTS

| | | | |
|---|---|---|---|
| 2,070,666 | 2/37 | Llewellyn | 332—37 |
| 2,591,637 | 4/52 | Tilley | 330—130 |
| 2,723,387 | 11/55 | Slavin | 330—137 X |
| 2,952,006 | 9/60 | McCarter | 330—86 X |
| 3,020,488 | 2/62 | De Miranda et al. | 330—59 |

ROY LAKE, *Primary Examiner.*

NATHAN KAUFMAN, *Examiner.*